Aug. 7, 1962  W. LEONHARD  3,048,755
SYNCHRONOUS MOTOR CONTROL
Filed May 7, 1959  2 Sheets-Sheet 1

WITNESSES
John C. Healy, Jr.
Ernest P. Klipfel

INVENTOR
Werner Leonhard
BY
Paul E. Friedemann
ATTORNEY

United States Patent Office 3,048,755
Patented Aug. 7, 1962

3,048,755
SYNCHRONOUS MOTOR CONTROL
Werner Leonhard, Stuttgart-Cannstatt, Germany, assignor to Westinghouse Electric Corporation, East Pittsburgh, Pa., a corporation of Pennsylvania
Filed May 7, 1959, Ser. No. 811,664
12 Claims. (Cl. 318—170)

This invention relates to synchronous motor controls, and more particularly to a system of control for pull-out protectoin for a synchronous motor.

Pull-out protection systems for a synchronous motor are used to detect a condition wherein the motor is out of synchronism because of excessive load, reduced line voltage, loss of field current, or some other cause. In order to avoid unnecessary service interruptions, it is necessary that pull-out be clearly differentiated from transients which occur when the line voltage varies, or the load varies. However, once it is determined that the rotor poles are slipping past the stator poles, the field current must be interrupted without delay and the discharge resistor must be placed across the winding, in order to develop induction motor torque. Occasionally it is desirable to entirely disconnect the motor from the line upon occurrence of a pull-out condition.

It is well known that when a synchronous motor is overloaded and pulled out of synchronism that there are violent current oscillations within the field winding, the stator winding and the damper winding until the direct current excitation is removed and the field resistor placed across the field winding. If, prior to removal of the excitation, the overload is removed or the line voltage returns to its proper level, the motor may accelerate and remain synchronized should the overload be removed before the motor has pulled beyond the motoring region of the rotor angle curve.

A pull-out protection scheme must be capable of discriminating between pull-out conditions and transients in the field current. The sensing scheme must respond reasonably fast in the first case, but it should not be affected by occurrence of the second. It is highly advantageous to have a pull-out protection adaptable to motors of widely varying size and design.

The object of this invention is to provide a pull-out protection scheme for a synchronous motor, which scheme is based on the sensing of the induced field current and employs solid state components.

A more specific object of this invention is to provide a pull-out protection circuit capable of counting a selected number of slip cycles before tripping the field contactor.

Another object of this invention is to provide a pull-out protection circuit for a synchronous motor which requires no critical adjustments and is adaptable to synchronous motors of any rating.

Further objects and advantages of my invention will be readily apparent from the following detailed description taken in conjunction with the accompanying drawing in which:

FIG. 1 shows a typical trace of the field current of a synchronous motor which is pulled out of step due to mechanical overload. The field current on the ordinate is plotted as a function of time, shown on the abscissa.

The direct current steady state magnitude of the field current is shown as $I_f$. At a time $t_1$ a mechanical overload is applied to the motor. A transient current is induced in the field winding as the rotor slips past the rotating field. While the initial rise of the field current may vary, depending on how the overload is applied and whether the motor was preloaded, the subsequent periodic transient is characteristic for pull-out. The frequency of the transient current is a function of the load, the damping characteristics of the motor and the inertia of the drive.

Figure 1:
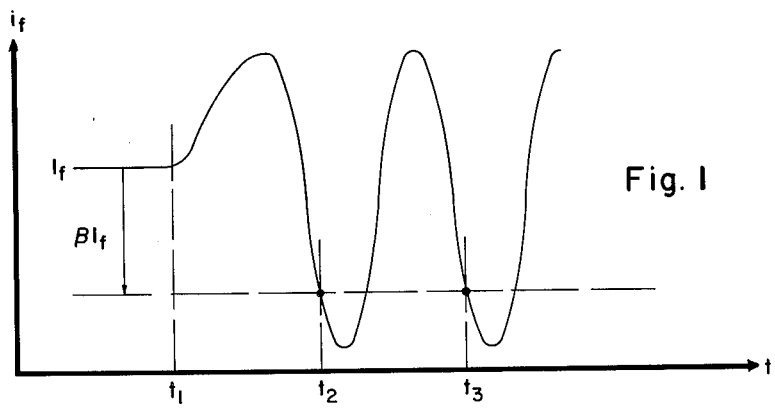
FIG. 1 shows a typical trace of the field current of a synchronous motor which is pulled out of step due to mechanical overload.

FIG. 1 illustrates the selection of a salient portion of the periodic transient current which is considered representative for one slip cycle. For several reasons, the dips in the field current wave are particularly suitable for sensing. It is found that the instantaneous field current decreases whenever the rotor has such a combination of angular position and slip speed that it approaches its nearest no-load position. This is due to the increasing flux in the field winding.

For example, when the rotor comes from generator angles, its instantaneous speed is subsynchronous. If the slip speed is substantial, this combination clearly indicates that the motor is out of synchronism, and each dip of the field current accounts for one slip cycle. On the other hand, when the rotor approaches the no-load position from motoring angles with substantial oversynchronous speed, a negative current is also induced without the motor being out of step. Such a transient may be initiated by unloading a heavily loaded or temporary overloaded motor. There is little danger that a field current transient caused by unloading the motor could be mistaken for a pull-out signal, because it is not repetitive. Also, the magnitude of the induced field current is usually smaller than on pull-out.

The pull-out sensing is therefore based on a count of successive negative transient field current cycles of large amplitude. After a predetermined number of slip cycles is detetced, either the field contactor is opened to allow resynchronization or both the line contactor and the field contactor are opened to shut-down the motor. In order to assure clear differentiation between stable unloading transients and pull-out, a slip cycle count of at least two is considered necessary.

FIGURE 1 shows that a count pulse is produced whenever the induced field current has a negative instantaneous value of a magnitude greater than $\beta I_f$. Stated another way, a count pulse is generated every time the instantaneous field current decreases to $$(1-\beta) \times I_f$$

The correct value of $\beta$ depends on the type of motor used, but in order that the scheme be applicable also to motors with rectifier excitation, $\beta$ should be less than unity. Approximate values are $\beta = 1.0$ for all standard motors of conventional size and speed and $0.5 < \beta < 0.9$ for large, slow speed motors. The criterion used for determining $\beta$ is that the sensing circuit will always respond on pullout but that it will be unaffected on transients. It is understood that on large unloading transients, the circuit may produce one count pulse.

Figure 2:
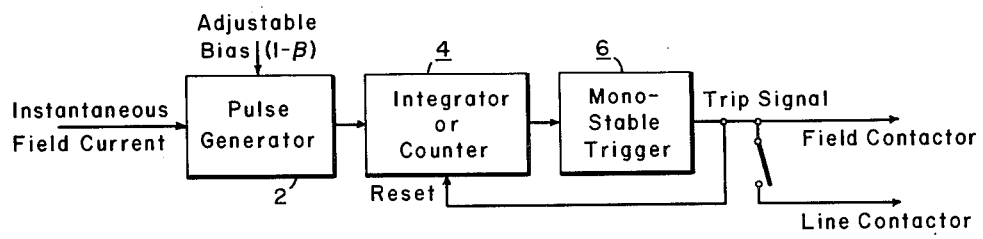
FIG. 2 shows a block diagram of an illustrative embodiment of this invention.

FIG. 2 shows a block diagram of my invention. A pulse generator 2 with adjustable bias senses the negative transient current in the field circuit and produces a pulse each time the instantaneous field current decreases to $(1-\beta)I_f$. A counter or integrator 4 counts the pulses and, after a predetermined number has occurred, triggers a monostable trigger 6 which generates a trip signal. At the same time, the integrator 4 can be reset. As stated previously the trip signal upon the occurrence of pull-out can be used to merely disconnect the field contactor for a resynchronization sequence or the trip signal can open the field contactor as well as the line contactor for shutdown of the motor.

Figure 3:
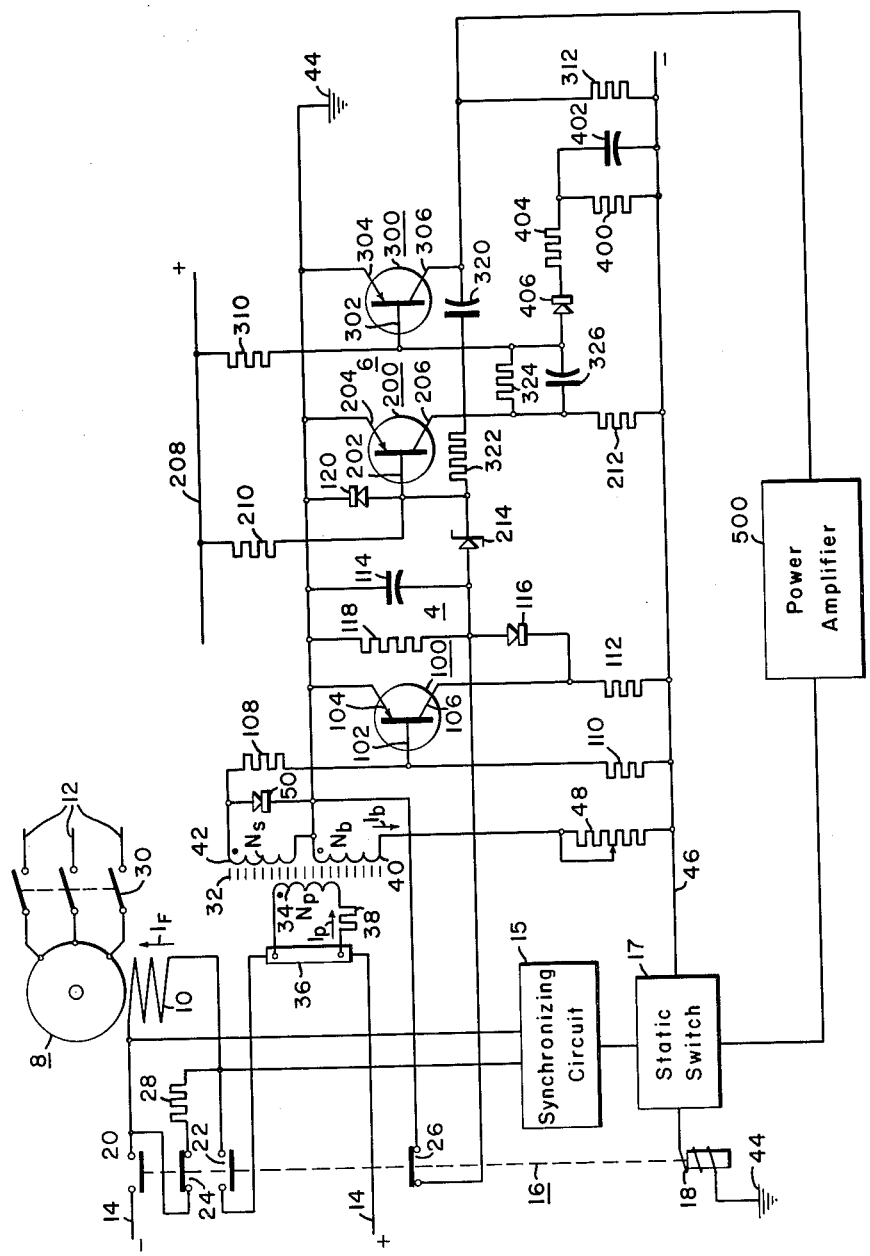
FIG. 3 is an electrical schematic diagram of the illustrative embodiment of this invention.

Referring to FIG. 3, the invention is shown embodied in an electrical control system for a synchronous motor 8 having a field winding 10. The alternating current power supply is indicated by the power supply leads 12 while the direct current source of excitation is represented by the excitation leads 14. The excitation leads 14 are illustrated to have a polarity as shown in the drawing. The drawing shows a conventional field contactor 16 having an operating coil 18 and two normally open contacts 20 and 22, respectively, as well as two normally closed contacts 24 and 26, respectively. The field winding 10 has a conventional field discharge resistor 28 connected across it through the normally closed contact 24. Both the field contactor 16 and a line switch 30 which connects the synchronous motor 8 to the power lines 12, are illustrated in their unenergized position.

During start-up of the machine, the line switch 30 is closed. Upon the motor attaining a proper speed for synchronizing, as determined by a suitable synchronizing circuit 15 connected across the field winding 10, a flip-flop static switch 17 receives a signal from the synchronizing circuit 15 to "close" thereby connecting the operating coil 18 between a negative bus bar 46 and ground 44. To disconnect the operating coil 18 from the negative bus bar 46, a signal to "open" is connected to be received by the static switch 17 from the pull-out protection circuit.

To sense the negative transient current in the field circuit during pull-out and to produce a pulse for each slip cycle a square loop magnetic core 32 is utilized. The core 32 has a primary winding 34 wound thereon which is connected across a current shunt 36 connected in series with the field winding 10, when the field contactor 16 is energized. A limiting resistor 38 is connected in series with the primary winding 34 across the current shunt 36. In addition, the core 32 has a bias winding 40 and a secondary winding 42. One end of each winding 40 and 42 is commonly grounded at the ground connection 44. The opposite end of the bias winding 40 is connected to a negative bus bar 46 through a variable resistor 48. A voltage limiter, herein shown as a rectifier 50, is connected across the secondary winding 42. For purposes of understanding the operation of the square loop magnetic core 32 as a pulse generator, the primary winding 34 is designated to have $N_p$ winding turns; the bias winding 40, $N_b$ winding turns; and the secondary winding 42, $N_s$ winding turns. Current flow through the primary winding 34 is indicated by the reference $I_p$ while current flow in the bias winding 40 is indicated by the reference $I_b$.

Figure 4:
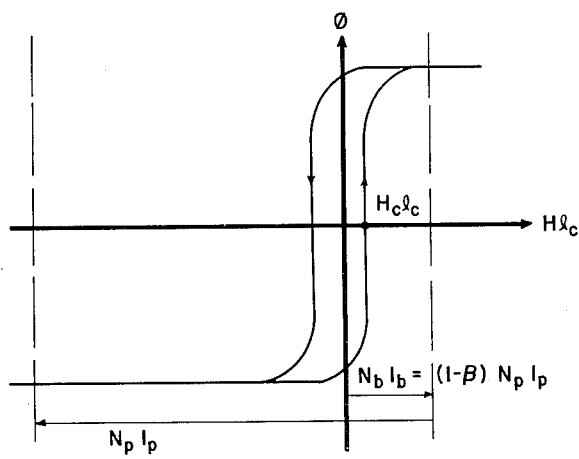
FIG. 4 is a hysteresis loop of a device used in FIG. 3, with the loop width greatly exaggerated.

A typical characteristic curve of the sensing core 32 is shown in FIG. 4. The abscissa in FIG. 4 represents the total ampere turns acting upon the core. The ordinate is a plot of flux in the conventional manner. The hysteresis loop width has been greatly exaggerated for purposes of clarity. The core 32 is biased to saturation by the adjustable continuous bias ampere-turns as determined by the variable resistor 48. The ampere-turns of the bias winding 40 is selected to be much greater than the excitation necessary to saturate the core, indicated as $H_cl_c$ in FIG. 4. During normal operation, the bias ampere-turns is overcome by the opposing primary ampere-turns, $I_pN_p$, where $I_p$ is a current proportional to the instantaneous field current $i_f$. The primary circuit comprising the primary winding 34 and resistor 38 may either be supplied from the shunt 36 in series with the field winding 10 as indicated in FIG. 3, or the primary winding 34 may be part of the field circuit itself. In the latter case, the current in the primary circuit $I_p$ will be equal to the instantaneous field current $i_f$. The circuit is so arranged that, whenever the instantaneous field current $i_f$ decreases to a magnitude less than $(1-\beta) \times I_f$, as previously described, the core 32 is reset to the opposite saturation state by the bias ampere turns. A voltage will be induced in the secondary winding 42 which will be proportional to the rate of change of the flux in the magnetic core when it is reset to the opposite saturation state. The induced voltage in the secondary winding 42 during the period of flux change is kept constant by the voltage limiter, or rectifier 50, poled so the forward characteristic of the rectifier will establish a reference in the secondary winding 42. Hence, a voltage pulse of approximately constant length is produced across the secondary winding 42 which is nearly independent of the rate of change of the field current. When the field current again increases, a voltage pulse of opposite polarity is induced in the windings of the saturating core, but has no effect on the subsequent circuit as can be seen from FIG. 3.

The voltage pulses of constant length, one for each slip cycle, are fed to a counter or integrator 4 herein shown as an analog transistor integrator of the resistance capacitance type. Of course, other integrators, such as binary counting circuits, could be substituted.

A transistor 100 having a base electrode 102, an emitter electrode 104, and collector electrode 106 is connected to receive the voltage pulses through its base electrode 102 connected through an isolating impedance 108. The base electrode 102 is biased negatively through a biasing resistor 110 connected to the negative bus bar 46. The emitter electrode 104 is connected to ground 44, while the collector electrode 106 is connected to the negative bus bar 46 through a current limiting resistor 112. The voltage pulses appearing at the base electrode 102 of the transistor 100 block the transistor 100 for a period of time equivalent to the constant length of a voltage pulse appearing at the base electrode 102. During that time the transistor 100 is rendered non-conductive a certain amount of charge is accumulated on a capacitor 114 connected in series with a rectifier 116 across the emitter-collector circuit. A like amount of charge will be added to the capacitor 114 during each pulse to the base electrode 102. The capacitor in effect counts each time the instantaneous field current $i_f$ decreases to a magnitude less than $(1-\beta) \times I_f$. A resistor 118 is connected across the capacitor 114 to establish a resistance-capacitance integrator with the resistor 118 serving as a discharge path. The rectifier 116 is poled to prevent leakage of the accumulated charge on the capacitor 114 through the transistor 100 when it is in the conducting state. A second rectifier 120 limits the positive bias voltage between base electrode 202 and ground 44.

A second transistor 200, having the base electrode 202, an emitter electrode 204 and collector electrode 206, is connected with the emitter electrode 204 connected to ground 44 and collector electrode 206 connected to the negative bus bar 46 through a current limiting resistor 212. The base electrode 202 is positively biased by the positive bus bar 208 through a dropping resistor 210. The base electrode 202 is also connected to receive a trip signal from the capacitor 114 through a Zener diode 214. After a predetermined number of voltage pulses across the capacitor 114, the breakdown voltage of the Zener reference diode 214 is exceeded and the trigger circuit is actuated resulting in a trip signal to the field contactor 16.

It will be understood that the Zener diode is a semiconductor rectifier, usually a silicon diode, which has the characteristic of blocking current flow in one direction when the voltage is below a predetermined valve while current is permitted to flow freely when the voltage is above a predetermined value. The breakdown is non-destructive so the current is cut off when the voltage again drops below the breakdown value. Of course, any device with a breakdown region as described may be used in place of the Zener diode 214.

A third transistor 300 is connected in the monostable trigger circuit. The transistor 300 has a base electrode 302, an emitter electrode 304, and a collector electrode 306. The emitter electrode 304 is connected to ground 44 while the collector electrode 306 is connected to the negative bus bar 46 through a current limiting-resistor 312. The output from the transistor 300 is fed back to the transistor 200 by means of a capacitor 320 in series with a resistor 322 across the collector electrode 306 and base electrode 202. The base electrode 302 is positively biased by connection to the positive bus bar 208 through a dropping resistor 310. In addition, the base electrode 302 is connected to the output of the transistor 200 through a resistor 324 and capacitor 326 in parallel across the collector electrode 206 and base electrode 302.

When a sufficient charge is built up on the capacitor 114 the reference diode 214 breaks down and a negative pulse is received at the base electrode 202 causing the transistor 200 to become conductive. The base electrode 302 is thus grounded through the resistor 324 and the positive bias through resistor 310 causes the transistor 300 to become non-conductive simulating a switch in the open position. The capacitor 320 charges to a reversed polarity through resistor 322, thereby applying a positive current to base 202 insuring rapid switching. An output signal appears between collector 306 and ground 44 when transistor 300 becomes non-conductive. This output signal is present until capacitor 114 discharges to a voltage below the breakdown voltage of Zener diode 214; then the monostable trigger 6 reverts to its original condition. The output from the trigger circuit 6 is fed to a power amplifier 500 which in turn provides a signal of sufficient power to actuate the static switch 17.

It is to be noted that the monostable trigger circuit 6 provides a temporary signal of sufficient duration to change the state of the static switch 17. In explanation, upon true pull-out the motor torque decreases drastically so that the motor speed drops very quickly below that needed to activate the synchronizing circuit. Thus by the time the pull-out circuit opens the field contactor the motor speed is too low to actuate the synchronizing circuit. The motor must then accelerate by induction torque until a sufficiently high speed is reached to cause an output from the synchronizing circuit and reclosing of the field contactor. Of course, if the synchronizing circuit has a continuous output when the field contactor is closed, it would be necessary for the pull-out signal to reset the synchronizing circuit.

In the case of a machine transient, only one signal or so is impressed on capacitor 114 so the monostable trigger 6 never has an output and the field contactor remains closed which is the desired operation.

The counter or integrator 4 is reset in the following manner. The resistor 118 across the capacitor 114 will gradually dissipate all the charge built-up on the capacitor 114 which did not result in the breakdown of the Zener diode 214. This could occur, for example, when only one pulse is generated during an unloading transient or pulses stored because of transient incident to synchronization.

When the trigger circuit 6 does respond because the charge on the capacitor exceeded the breakdown potential of the Zener diode 214, the integrator must be reset immediately. Referring to FIG. 3, the normally closed contact 26 of the field contactor 16 is positioned across the capacitor 114. Upon occurrence of a pull-out signal, the operating coil 18 is deenergized with the result that the normally closed contact 26 is returned to its initial position thereby shorting the capacitor 114 from accumulating any further charge. If the motor is expected to slip several poles when synchronizing, because of a heavy load or a large inertia load, the integrator may be clamped to zero for some time after the field is applied by mechanically delaying the opening of the contact 26 for a period of time sufficient to clear synchronizing transients.

It was explained previously that the integrator would normally be so designed as to count between two and, say, five slip cycles before tripping the field contactor 16. Of course, any other integrator, for example a binary counter, could be substituted for the resistive capacitive integrator 4 shown in FIG. 3. With a binary counter, the voltage pulses need not be of constant length and the voltage limiter in the secondary winding 42 may be omitted.

It was mentioned previously that $\beta=1.0$ would be an adequate adjustment for smaller standard synchronous motors, resulting essentially in sensing the zero intersections of the field current. If the field current is reversible, such as when the exciter or D.C. but or rectifiers with sufficiently low ballast resistor are used for excitation, the bias winding 40 on the sensing core 32 may be omitted. If the field current is not reversible, minimum bias, which just keeps the core saturated, should be employed, resulting in sensing the field current slightly above zero.

It is to be noted that the same pull-out protection scheme can be employed on alternators, since their field current on pull-out follows essentially the same pattern, as seen in Fig. 1.

In conclusion, a simple solid-state pull-out protection scheme for synchronous motors has been provided. The scheme is based on sensing the periodic transient current in the field circuit and counting slip cycles. No critical adjustments are required and the scheme may be used on standard synchronous motors of the usual size. Complete isolation between the motor circuits and the control circuits is provided. At the same time a pull-out protection circuit for a synchronous motor has been provided utilizing static elements which permit finer adjustment, improved reliability and sensitivity, and requires considerably less space than the conventional pull-out protection schemes.

While certain specific embodiments of the invention have been shown and described for the purpose of illustration, it is to be understood that various modifications, substitutions and alterations within the spirit and scope of the invention are herein meant to be included.

I claim as my invention:

1. In a pull-out protection circuit for a synchronous alternating current motor having a field winding adapted to be connected to an excitation source, means responsive to a trip signal for disconnecting the field winding from the excitation source, pulse generating means operably connected to compare the instantaneous value of field current in the field winding to a reference value and produce a signal pulse upon each occurrence of a predetermined difference, means responsive to a predetermined number of signal pulses for providing a trigger pulse, monostable trigger means responsive to said trigger pulse for providing a trip signal to said first mentioned means.

2. In a pull-out protection circuit for a synchronous alternating current motor having a field winding adapted to be connected to an excitation source, a saturable magnetic core having a first winding, a second winding and a third winding inductively disposed thereon, means for providing an input current to said first winding responsive to the instantaneous magnitude of field current in said field winding, means for adjusting the biasing effect of said second coil, said third winding having an output voltage whenever said input current is sufficient to overcome the biasing effect of said second winding, voltage limiter means across said third winding providing a voltage pulse of substantially constant length and substantially independent of the rate of change of said input current, an analog transistor integrator means responsive to a predetermined number of said voltage pulses, for providing a pull-out signal, and means responsive to said pull-out signal for disconnecting the field winding from the excitation source.

3. In a pull-out protection circuit for a synchronous alternating current motor having a field winding adapted to be connected to an excitation source, pulse generating means operably connected to compare the instantaneous value of field current in the field winding to a reference value and produce a signal pulse upon each occurrence of a predetermined difference, and means responsive to a predetermined number of signal pulses for effecting a predetermined change in the connections of said motor.

4. In a pull-out protection circuit for a synchronous alternating current motor having a field winding adapted to be connected to an excitation source, means operably connected to said field winding for producing a pulse whenever the induced field current in the field winding has a negative instantaneous value of a magnitude greater than a predetermined value, and means responsive to a predetermined number of said pulses for effecting a predetermined change in the connections of said motor.

5. In a pull-out protection circuit for a synchronous alternating current motor having a field winding adapted to be connected to an excitation source, means operably connected to said field winding for generating a pulse every time the instantaneous field current decreases to $(1-\beta)I_f$, where $\beta$ is chosen to be substantially equal to 1.0 for conventional size and speed motors and ($0.5 < \beta < 0.9$) for large slow speed motors, and $I_f$ is equal to the direct current steady state field current, and means responsive to a predetermined number of said pulses for effecting a predetermined change in the connections of said motor.

6. In a pull-out protection circuit for a synchronous alternating current motor having a field winding adapted to be connected to an excitation source of predetermined polarity, means operably connected to said field winding responsive to a predetermined number of transient field current half waves of only opposite polarity and exceeding a predetermined magnitude for providing a trip signal, and means responsive to said trip signal for effecting a predetermined change in the connections of said motor.

7. In a pull-out protection circuit for a synchronous alternating current motor having a field winding adapted to be connected to an excitation source, means responsive to a signal for effecting a predetermined change in the connections of said motor, capacitive means operably connected to said field winding responsive to a salient portion of the induced alternating current in the field winding for charging in predetermined incremental steps to a preselected level of charge, an incremental step being taken during the occurrence of each salient portion, and means responsive to the attainment of said preselected level of charge on said capacitive means for providing a signal to said first-mentioned means.

8. In a pull-out protection circuit for a synchronous alternating current machine having a field winding adapted to be connected to an excitation source, pulse generating means operably connected to compare the instantaneous value of field current in the field winding to a reference value and produce a signal pulse upon each occurrence of a predetermined difference, and means responsive to a predetermined number of signal pulses for effecting a predetermined change in said machine.

9. In a pull-out protection circuit for a synchronous alternating current machine having a field winding adapted to be connected to an excitation source of given polarity, means operably connected to said field winding for producing a pulse whenever the induced field current in the field winding has an opposite polarity instantaneous value of a magnitude greater than a predetermined value, and means responsive to a predetermined number of said pulses for effecting a change in said machine.

10. In a pull-out protection circuit for a synchronous alternating current motor having a field winding adapted to be connected to an excitation source of given polarity, means operably connected to said field winding for producing a pulse whenever the induced field current in the field winding has an opposite polarity instantaneous value of a magnitude greater than a predetermined value, and means responsive to a predetermined number of said pulses for effecting a predetermined change in the connections of said motor.

11. In a pull-out protection circuit for a synchronous alternating current motor having a field winding adapted to be connected to an excitation source, means responsive to a trip signal for disconnecting the field winding from the excitation source, pulse generating means operably connected to compare the instantaneous value of field current in the field winding to a reference value and produce a signal pulse upon each occurrence of a predetermined difference, means responsive to a predetermined number of signal pulses for providing a trip signal to said first mentioned means.

12. In a pull-out protection circuit for a synchronous alternating current machine having a field winding adapted to be connected to an excitation source, a saturable magnetic core having a first winding and a second winding inductively disposed thereon, means for providing an input current to said first winding responsive to the instantaneous magnitude of field current in said field winding, means for applying a reference bias to said core, said second winding having an output voltage whenever said input current is sufficient to overcome the effect of said bias, voltage limiter means across said second winding providing a voltage pulse of substantially constant length and substantially independent of the rate of change of said input current, an analog transistor integrator means responsive to a predetermined number of said voltage pulses for providing a pull-out signal, and means responsive to said pull-out signal for effecting a change in said machine.

References Cited in the file of this patent

UNITED STATES PATENTS

| | | |
|---|---|---|
| 2,245,189 | Ewing | June 10, 1941 |
| 2,530,997 | Schaelchlin | Nov. 21, 1950 |
| 2,632,875 | Bellinger | Mar. 24, 1953 |
| 2,709,235 | Baude | May 24, 1955 |
| 2,914,718 | Baude | Nov. 24, 1959 |